(12) United States Patent
Takahashi

(10) Patent No.: US 10,128,517 B2
(45) Date of Patent: Nov. 13, 2018

(54) FUEL CELL SYSTEM

(71) Applicant: TOYOTA JIDOSHA KABUSHIKI KAISHA, Toyota-shi, Aichi-ken (JP)

(72) Inventor: Yasushi Takahashi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 165 days.

(21) Appl. No.: 15/089,934

(22) Filed: Apr. 4, 2016

(65) Prior Publication Data

US 2016/0308228 A1 Oct. 20, 2016

(30) Foreign Application Priority Data

Apr. 15, 2015 (JP) .................................. 2015-083728

(51) Int. Cl.
| | |
|---|---|
| *H01M 8/04* | (2016.01) |
| *H01M 8/24* | (2016.01) |
| *H01M 8/04746* | (2016.01) |
| *H01M 8/04089* | (2016.01) |
| *H01M 8/0438* | (2016.01) |

(52) U.S. Cl.
CPC ... *H01M 8/04753* (2013.01); *H01M 8/04089* (2013.01); *H01M 8/04395* (2013.01)

(58) Field of Classification Search
CPC .... H01M 8/04; H01M 8/0489; H01M 8/0411; H01M 8/04395; H01M 8/0473; H01M 8/2457
See application file for complete search history.

(56) References Cited

U.S. PATENT DOCUMENTS

| | | | |
|---|---|---|---|
| 2008/0152962 A1* | 6/2008 | Poonamallee | .... H01M 8/04373 429/408 |
| 2009/0044994 A1* | 2/2009 | Brighton, II | .......... B60L 11/005 180/65.31 |
| 2010/0055522 A1 | 3/2010 | Manabe et al. | |
| 2010/0112386 A1 | 5/2010 | Kirklin | |

(Continued)

FOREIGN PATENT DOCUMENTS

| | | |
|---|---|---|
| DE | 102009050938 A1 | 5/2010 |
| DE | 102013100400 A1 | 8/2013 |

(Continued)

*Primary Examiner* — Kenneth J Douyette
(74) *Attorney, Agent, or Firm* — Hunton Andrews Kurth LLP

(57) ABSTRACT

A fuel cell system includes: a fuel cell stack; a centrifugal compressor that compresses and supplies the oxidant gas to the fuel cell stack; a regulating valve that controls pressure at an outlet of the compressor; and a control unit that controls the compressor and the regulating valve, wherein the control unit determines a rotation speed of the compressor and an open degree of the regulating valve based on a target air flow rate corresponding to a current value instructed to the fuel cell stack, actuates the compressor based on the determined rotation speed, and actuates the regulating valve based on the determined open degree. The control unit executes feedback control to reduce the difference between an actual air flow rate and a target air flow rate by changing the open degree of the regulating valve while maintaining the rotation speed of the compressor.

3 Claims, 6 Drawing Sheets

(56) References Cited

U.S. PATENT DOCUMENTS

| | | | | |
|---|---|---|---|---|
| 2012/0070753 A1* | 3/2012 | Nakamura | .............. | C01B 3/384 |
| | | | | 429/423 |
| 2013/0209906 A1 | 8/2013 | Harris et al. | | |
| 2014/0120440 A1* | 5/2014 | Nolan | ............... | H01M 8/04955 |
| | | | | 429/431 |
| 2014/0120443 A1* | 5/2014 | Zhang | ............... | H01M 8/04753 |
| | | | | 429/444 |
| 2014/0120447 A1* | 5/2014 | Mussro | ................... | F04B 49/06 |
| | | | | 429/444 |
| 2015/0086894 A1 | 3/2015 | Ueda et al. | | |

FOREIGN PATENT DOCUMENTS

| | | |
|---|---|---|
| JP | H1167240 A | 3/1999 |
| JP | 2004-179126 A | 6/2004 |
| JP | 2005044654 A | 2/2005 |
| JP | 2008-226591 A | 9/2008 |
| JP | 2009-123550 A | 6/2009 |
| JP | 2009-181925 A | 8/2009 |
| JP | 2009-277502 A | 11/2009 |
| WO | 2013/157488 A1 | 10/2013 |

\* cited by examiner

MAP OF COMPRESSOR ROTATION SPEED AND
REGULATING VALVE OPEN DEGREE THAT CONTROL
AIR FLOW RATE AND DISCHARGE PRESSURE

MAP INDICATING RELATIONSHIP BETWEEN OPEN DEGREE OF
BYPASS VALVE AND FLOW RATE RATIO

FUEL CELL SYSTEM

CROSS-REFERENCE TO RELATED APPLICATION

This application is based upon and claims the benefit of priority of the prior Japanese Patent Application No. 2015-083728, filed on Apr. 15, 2015, the entire contents of which are incorporated herein by reference.

FIELD OF THE INVENTION

The present invention relates to a fuel cell system.

BACKGROUND

A fuel cell system generates electric power by a chemical reaction between an oxidant gas and a fuel gas. At the time of power generation, the oxidant gas is fed to a fuel cell stack under pressure by a compressor in response to the requested output. For example, International Publication No. 2013/157488 discloses a suggestion for feeding the oxidant gas at the target flow rate appropriately.

SUMMARY OF THE INVENTION

It is therefore an object of the present invention to provide a fuel cell system that achieves high responsiveness of a flow rate of air supplied to a fuel stack under pressure.

According to an aspect of the present invention, there is provided a fuel cell system including: a fuel cell stack that is supplied with an oxidant gas and a fuel gas to generate electric power; a centrifugal compressor that compresses and supplies the oxidant gas to the fuel cell stack; a regulating valve that controls pressure at an outlet of the compressor; and a control unit that controls the compressor and the regulating valve, wherein the control unit includes: a command unit that determines a rotation speed of the compressor and an open degree of the regulating valve based on a target air flow rate corresponding to a current value instructed to the fuel cell stack, actuates the compressor based on the determined rotation speed, and actuates the regulating valve based on the determined open degree; an actual air flow rate acquisition unit that acquires a value of an actual flow rate of air supplied to the fuel cell stack while the compressor and the regulating valve operate based on commands from the command unit; and an air flow rate difference acquisition unit that calculates a difference between the actual flow rate of air and the target air flow rate; and a feedback control unit that reduces the difference in air flow rate by changing the open degree of the regulating valve while maintaining the rotation speed of the compressor.

DETAILED DESCRIPTION

Figure 1:
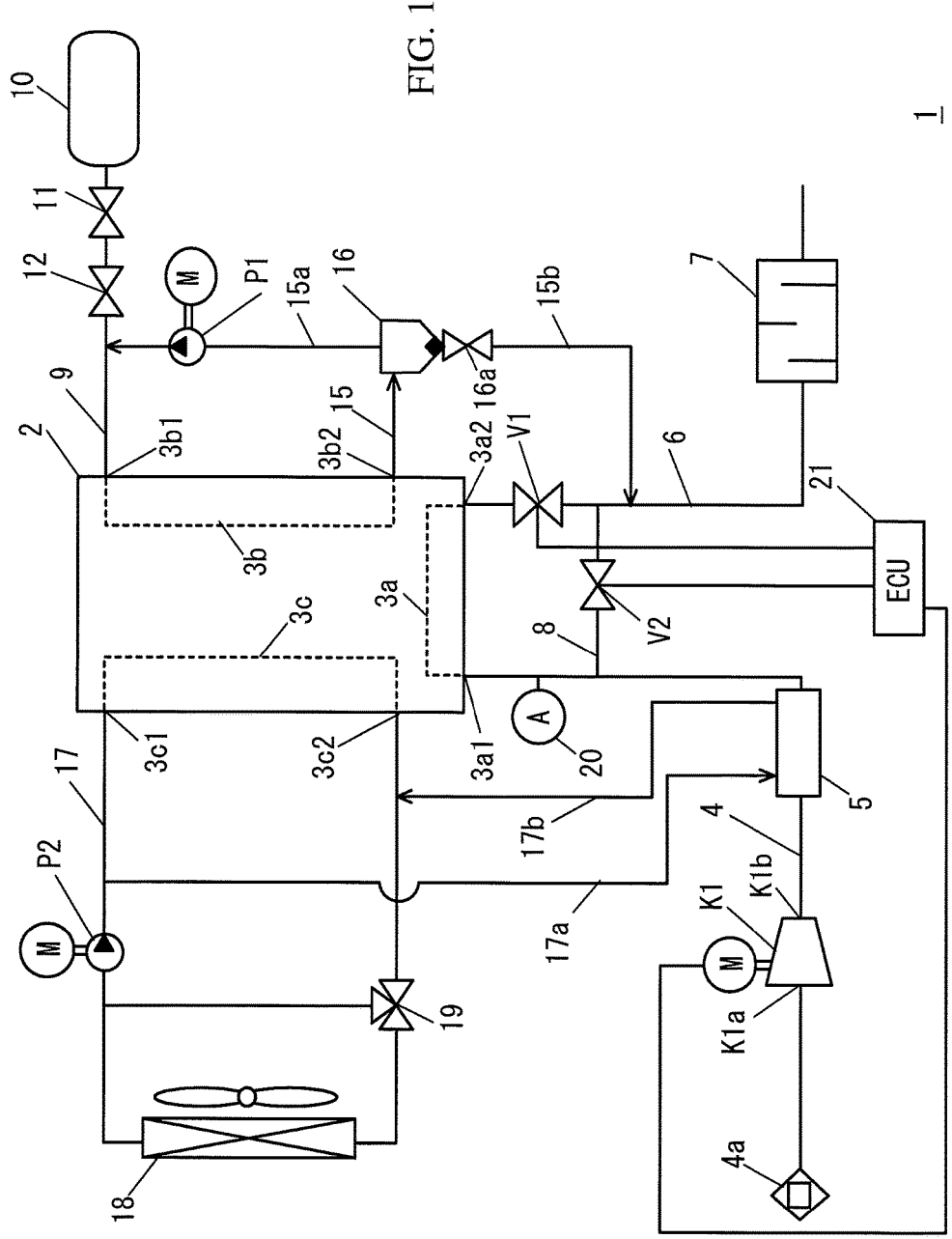
FIG. 1 is an explanatory diagram illustrating an outline configuration of a fuel cell system in accordance with an embodiment.

The compressor that feeds the oxidant gas to the fuel cell stack under pressure is generally categorized into a centrifugal compressor and a displacement compressor. The centrifugal compressor compresses air toward the outlet of the compressor by using centrifugal force caused by the rotation of the fins. The centrifugal compressor can be configured to be compact and is advantageous in cost compared to the displacement compressor. Thus, the centrifugal compressor may be employed in the fuel cell system to emphasize the above described advantages. When the centrifugal compressor is employed in the fuel cell system, the achievement of an appropriate flow rate of air has been attempted by controlling the rotation speed of the compressor while keeping the outlet pressure of the conduit for the oxidant gas that is located in the fuel cell stack constant with a valve that controls the back pressure of the fuel cell stack. However, when the rotation speed of the compressor is controlled, the delay occurs till the rotation speed reaches a target rotation speed. Thus, there has been room for improvement in achieving the good responsiveness of the flow rate of air.

Hereinafter, a description will be given of an embodiment of the present invention with reference to accompanying drawings. In the drawings, the size of each component, and the ratio between the components may not completely correspond to those of the actual ones. Some drawings may omit the illustration of the details of the component or the illustration of a component that is mounted in a reality. The components not illustrated in the drawings may be mentioned in the following description.

(Embodiment)

A description will first be given of a fuel cell system 1 of an embodiment with reference to FIG. 1. FIG. 1 is an explanatory diagram illustrating an outline configuration of the fuel cell system 1 of the embodiment. The fuel cell system 1 may be mounted on movable bodies such as vehicles, vessels, planes, and robots, and may be applied to stationary power sources. The fuel cell system 1 includes a fuel cell stack 2, an oxidant gas supply conduit 4, an intercooler 5, a compressor K1, a fuel gas supply conduit 9, a hydrogen tank 10, pipes interconnecting these components, a regulating valve V1, a bypass valve V2, and other valves. The compressor K1 is a so-called centrifugal compressor that feeds an oxidant gas under pressure by the rotation of a motor. The fuel cell system 1 includes an ECU (Electronic Control Unit) 21 functioning as a control unit. The fuel cell stack 2 in the present embodiment is of a solid high polymer type. The fuel cell stack 2 includes multiple unit cells each including a cathode electrode, an anode electrode, and an electrolyte membrane located between the cathode electrode and the anode electrode. The unit cells are stacked to form the fuel cell stack 2. An oxidant gas conduit 3a and a fuel gas conduit 3b are formed inside the fuel cell stack 2. The electrolyte membrane is, for example, a solid polymer electrolyte membrane having proton conductivity. In FIG. 1, the unit cells are not illustrated. A coolant conduit 3c that allows a coolant used to cool the fuel cell stack 2 to flow therethrough is located in the fuel cell stack 2. In the fuel cell stack 2, a hydrogen gas, i.e., a fuel gas, is supplied to the anode electrode, and air containing oxygen, i.e., an oxidant gas, is supplied to the cathode electrode. Hydrogen ions generated by the catalytic reaction at the anode electrode penetrate through the electrolyte membrane, move to the cathode electrode, and undergo electrochemical reaction with oxygen. The electric power is generated through this process. A voltmeter that measures a voltage value of the generated electric power, and an ammeter that measures a current value of the generated electric power are coupled to the fuel cell stack 2. The coolant flowing through the coolant conduit 3c cools the fuel cell stack 2.

The oxidant gas supply conduit 4 is connected to the inlet of the fuel cell stack 2, more specifically, to an inlet 3a1 of the oxidant gas conduit 3a of the fuel cell stack 2. An air cleaner 4a is attached to the end of the oxidant gas supply conduit 4. The compressor K1 that feeds air to the fuel cell stack 2 under pressure is arranged in the oxidant gas supply conduit 4. The compressor K1 includes an inlet K1a and an outlet K1b. An air flow meter 20 is located between the outlet K1b of the compressor K1 of the oxidant gas supply conduit 4 and the inlet 3a1 of the oxidant gas conduit 3a.

The intercooler 5 is arranged between the inlet 3a1 of the oxidant gas conduit 3a and the outlet K1b of the compressor K1 in the oxidant gas supply conduit 4. The intercooler 5 is connected to a coolant circulation conduit 17, and exchanges heat with the coolant to cool air discharged from the compressor K1. When the warm-up of the fuel cell stack 2 is requested, the intercooler 5 rises the temperature of the coolant with the heat of air of which the temperature has increased due to the compression by the compressor K1. The specifics of the coolant circulation conduit 17 through which the coolant circulates is described later. The air flow meter 20 is arranged further downstream than the intercooler 5.

An oxidant gas discharge conduit 6 is connected to an outlet 3a2 of the oxidant gas conduit 3a of the fuel cell stack 2. The regulating valve V1 is arranged in the oxidant gas discharge conduit 6. The regulating valve V1 regulates pressure at the outlet of the fuel cell stack 2, more specifically, pressure at the outlet 3a2 of the oxidant gas conduit 3a. That is to say, the regulating valve V1 regulates cathode back pressure. At this time, pressure at the outlet K1b of the compressor K1 is also controlled by the cathode back pressure and the pressure drop in the fuel cell stack 2. In the fuel cell system 1, the pressure of air introduced into the fuel cell stack 2 is controlled to achieve the flow rate of air corresponding to an instructed current value of the fuel cell stack 2 by adjusting the open degree of the regulating valve V1. That is to say, a commanded open degree of the regulating valve V1 is determined based on the instructed current value of the fuel cell stack 2, and the actual open degree is adjusted. When the fine tuning of the flow rate air is required, the open degree of the regulating valve V1 is adjusted. A muffler 7 is arranged further downstream than the regulating valve V1 in the oxidant gas discharge conduit 6. The regulating valve V1 may be directly mounted to the outlet 3a2 of the oxidant gas conduit 3a located inside the fuel cell stack 2, but is not always required to be directly mounted to the outlet 3a2 of the oxidant gas conduit 3a. The regulating valve V1 is only required to be arranged further downstream than the outlet 3a2 of the oxidant gas conduit 3a. The regulating valve V1 may be arranged near the outlet 3a2 through a short conduit from the outlet 3a2 of the oxidant gas conduit 3a as with in the present embodiment where the regulating valve V1 is arranged in, for example, the oxidant gas discharge conduit 6 connected to the outlet 3a2.

The fuel cell system 1 includes a bypass conduit 8 that diverges from the oxidant gas supply conduit 4 at the downstream side of the intercooler 5, and bypasses the fuel cell stack 2, i.e., bypasses the oxidant gas conduit 3a to connect to the oxidant gas discharge conduit 6. The bypass valve V2 that controls the opening state of the bypass conduit 8 is arranged in the bypass conduit 8. The bypass valve V2 is opened when the battery is charged to nearly full capacity at the time of regenerative power generation of a drive motor and the compressor K1 is driven to consume electric power. Accordingly, air is discharged to the oxidant gas discharge conduit 6 without being sent to the fuel cell stack 2.

The fuel gas supply conduit 9 is connected to an inlet 3b1 of the fuel gas conduit 3b of the fuel cell stack 2. The hydrogen tank 10 that is a supply source of hydrogen is connected to the end of the fuel gas supply conduit 9. The hydrogen tank 10 reserves hydrogen as a high-pressure fuel gas therein. A shut valve 11 that shuts off supply of hydrogen, and a regulator 12 that reduces the pressure of hydrogen are arranged in the fuel gas supply conduit 9.

An exhaust pipe 15 is connected to an outlet 3b2 of the fuel gas conduit 3b of the fuel cell stack 2. A gas-liquid separator 16 is arranged at the end of the exhaust pipe 15. In the gas-liquid separator 16, a circulation conduit 15a and a purge conduit 15b diverge. In the gas-liquid separator 16, water contained in an anode off-gas is separated. The anode off-gas of which water has been separated is discharged toward the circulation conduit 15a. On the other hand, separated water is discharged toward the purge conduit 15b. A pump P1 is arranged in the circulation conduit 15a. The arrangement of the pump P1 in the circulation conduit 15a allows the anode off-gas to be supplied to the fuel gas conduit 3b again. The purge conduit 15b diverging in the gas-liquid separator 16 is connected to the downstream side of the regulating valve V1 located in the oxidant gas discharge conduit 6. A purge valve 16a is arranged in the purge conduit 15b. The opening of the purge valve 16a allows the anode off-gas that is not circulated to be discharged together with a cathode off-gas.

A first end of the coolant circulation conduit 17 is connected to an inlet 3c1 of the coolant conduit 3c of the fuel cell stack 2. A second end of the coolant circulation conduit 17 is connected to an outlet 3c2 of the coolant conduit 3c. A pump P2 that circulates the coolant to supply the coolant into the fuel cell stack 2 is arranged in the coolant circulation conduit 17. A radiator 18 is also arranged in the coolant circulation conduit 17. A three-way valve 19 is located in the coolant circulation conduit 17, and a bypass conduit that bypasses the radiator 18 diverges from the three-way valve 19. The three-way valve 19 is a so-called thermostat valve that includes a temperature sensor and changes the open/close state depending on the temperature of the coolant, but may be an electric valve. The three-way valve 19 circulates the coolant toward the radiator 18 to cool the coolant when the temperature of the coolant becomes greater than a predetermined value.

The intercooler 5 is connected to the coolant circulation conduit 17. More specifically, a first incoming conduit 17a and a second incoming conduit 17b diverge from the coolant circulation conduit 17. The first incoming conduit 17a diverges between the pump P2 and the inlet 3c1 of the coolant conduit 3c, and connects to the intercooler 5. The coolant flows into the intercooler 5 through the first incoming conduit 17a. On the other hand, the second incoming conduit 17b diverges between the three-way valve 19 and the outlet 3c2 of the coolant conduit 3c, and connects to the intercooler 5. The coolant returns from the intercooler 5 to the coolant circulation conduit 17 through the second incoming conduit 17b.

The fuel cell system 1 includes the ECU 21. The ECU 21 is configured as a microcomputer including a CPU, a ROM, and a RAM thereinside, and functions as a control unit. The ECU 21 is electrically connected to the pumps P1, P2, and controls the operation of these devices. The ECU 21 is also electrically connected to the compressor K1, and the ECU 21 commands the compressor K1 to operate at a desired rotation speed. That is to say, the ECU 21 sends a commanded rotation speed to the compressor K1. The ECU 21 is further electrically connected to the regulating valve V1, the bypass valve V2, the shut valve 11, and the purge valve 16a, and controls the opening/closing of these valves. The values detected by various sensors are input to the ECU 21. The ECU 21 stores a current-voltage map, and the like. The ECU 21 executes an output setting process. That is to say, the ECU 21 sets an air supply amount, a cathode back pressure, a hydrogen supply amount, a hydrogen pressure, a current value, and a voltage.

Figure 2:
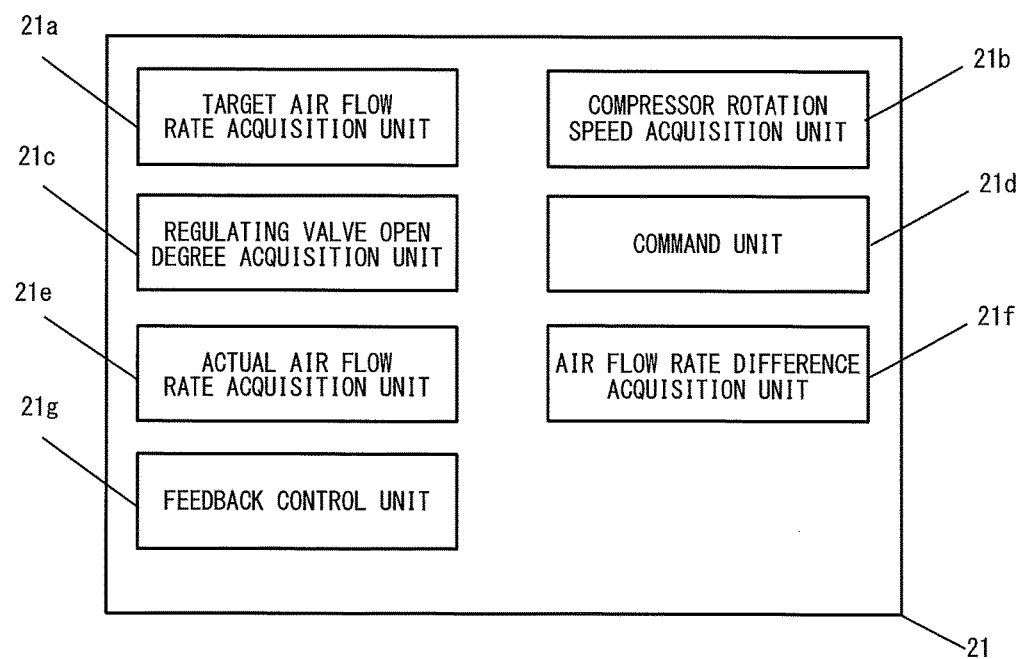
FIG. 2 is a functional block diagram of a control unit equipped to the fuel cell system of the embodiment.

As illustrated in FIG. 2, the ECU 21 includes a target air flow rate acquisition unit 21a, a compressor rotation speed acquisition unit 21b, a regulating valve open degree acquisition unit 21c, a command unit 21d, an actual air flow rate acquisition unit 21e, an air flow rate difference acquisition unit 21f, and a feedback control unit 21g. The target air flow rate acquisition unit 21a acquires a target air flow rate corresponding to a current value instructed to the fuel cell stack 2. More specifically, the target air flow rate acquisition unit 21a acquires the target air flow rate to achieve the current value instructed to the fuel cell stack 2 based on a power generation state, an accelerator position, and the like on a moment-to-moment basis. The compressor rotation speed acquisition unit 21b determines a commanded rotation speed of the compressor K1 based on the target air flow rate acquired by the target air flow rate acquisition unit 21a. The regulating valve open degree acquisition unit 21c determines a commanded open degree of the regulating valve V1 based on the acquired target air flow rate. The details of the determination of the commanded rotation speed of the compressor K1 and the commanded open degree of the regulating valve V1 are described later. The command unit 21d actuates the compressor K1 based on the commanded rotation speed of the compressor K1 that has been determined, and actuates the regulating valve V1 based on the commanded open degree of the regulating valve V1 that has been determined. The actual air flow rate acquisition unit 21e acquires the value of the actual air flow rate measured by the air flow meter 20. The air flow rate difference acquisition unit 21f calculates the difference between the value of the target air flow rate and the value of the actual air flow rate. The feedback control unit 21g executes feedback control that reduces the difference in the air flow rate calculated by the air flow rate difference acquisition unit 21f. At this time, the feedback control unit 21g corrects the air flow rate by adjusting the open degree of the regulating valve V1 while maintaining the actual rotation speed of the compressor K1, more specifically, keeping the actual rotation speed constant. The ECU 21 also controls the open degree of the bypass valve V2.

Figure 3:
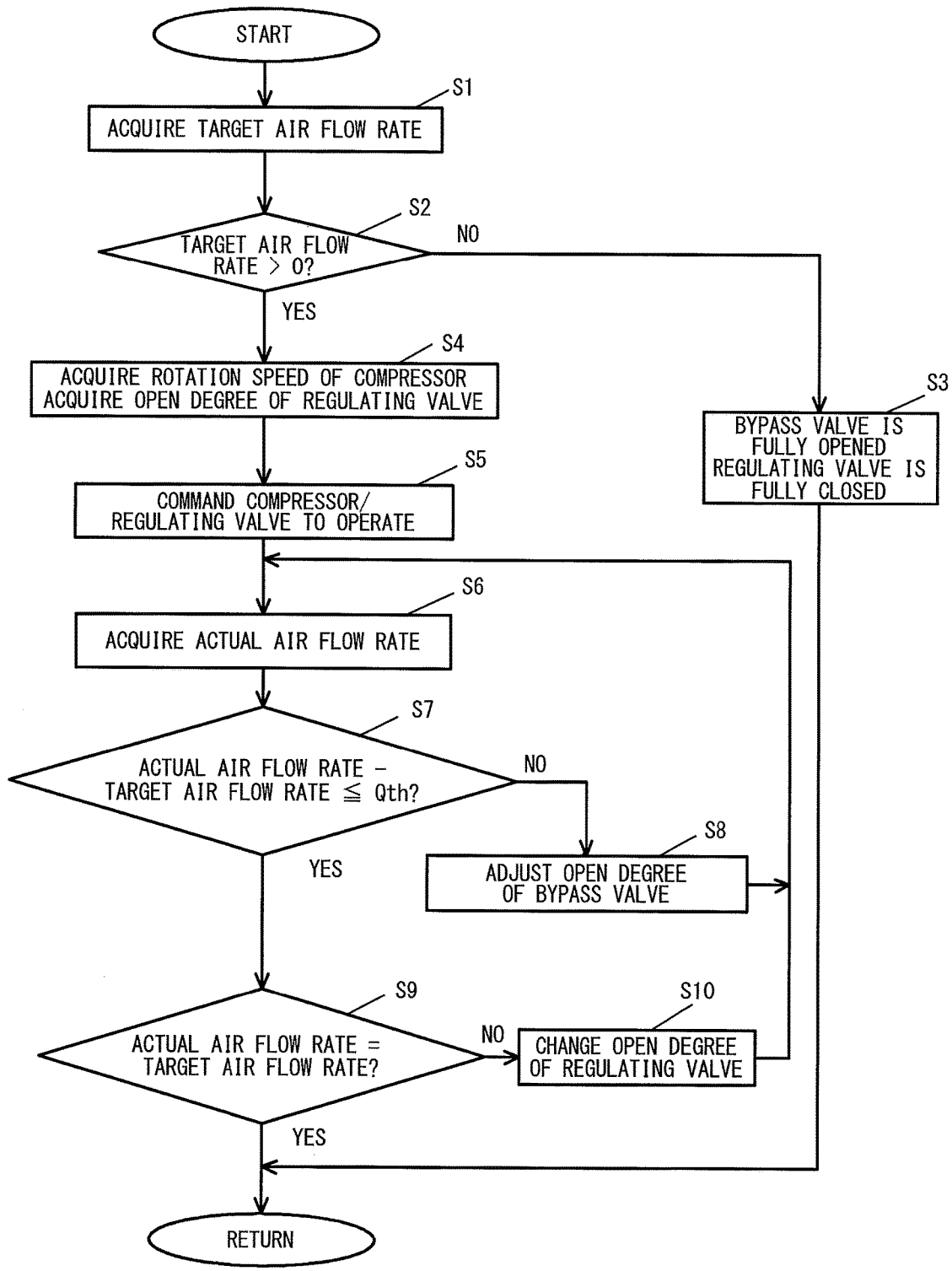
FIG. 3 is a flowchart illustrating control of the fuel cell system in the embodiment.

A description will next be given of the control of the fuel cell system 1 of the embodiment with reference to FIG. 3. FIG. 3 is a flowchart illustrating the control of the fuel cell system 1 in the embodiment. The control of the fuel cell system 1 is mainly executed by the ECU 21. The fuel cell system 1 is continuously controlled after the fuel cell system 1 starts operating.

Figure 4:
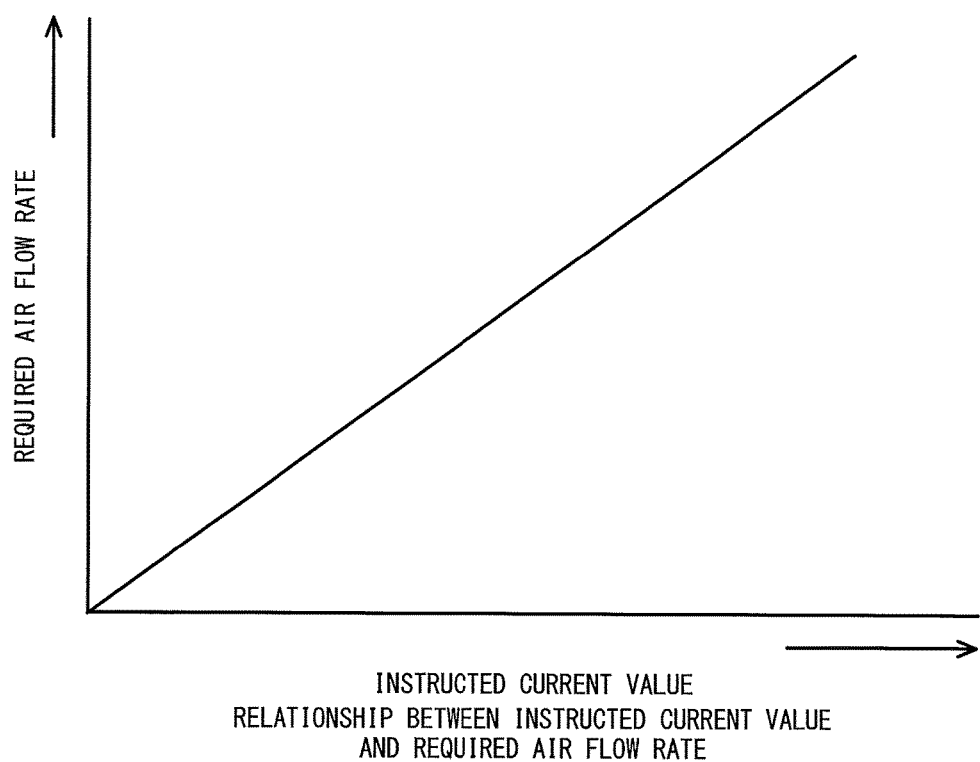
FIG. 4 is a graph illustrating an outline relationship between an instructed current value and a required air flow rate.

At step S1, the ECU 21 acquires the target flow rate of air introduced into the oxidant gas conduit 3a of the fuel cell stack 2. The target air flow rate is acquired by the target air flow rate acquisition unit 21a. More specifically, the ECU 21 acquires the value of the target air flow rate based on a map illustrated in FIG. 4. FIG. 4 is a graph illustrating an outline relationship between the instructed current value and a required air flow rate. The instructed current value is a value instructed from the ECU 21 to the fuel cell stack 2, and the fuel cell system 1 is controlled so that the output of the fuel cell stack 2 achieves the instructed current value. When the fuel cell system 1 is mounted in a vehicle, the requested outputs to the fuel cell stack 2 and the battery are determined based on the desired output requested to the fuel cell system 1 corresponding to the position of the accelerator equipped in the vehicle. However, the fuel cell stack 2 cannot always supply the requested output immediately. More specifically, due to, for example, the transient response characteristics of the compressor K1, the output capable of being supplied from the fuel cell stack 2 may be less than the output requested from the vehicle. After acquiring the output capable of being supplied from the fuel cell stack 2, the ECU 21 corrects the requested output to the fuel cell stack 2 as necessary, and determines the instructed current value based on a stored current-power curve (I-P curve) of the fuel cell stack 2 as a current value capable of achieving the corrected requested output. The required air amount is calculated so that the instructed current value is achieved. The calculated required air amount is determined as the value of the target air flow rate.

At step S2 subsequent to step S1, the ECU 21 determines whether the value of the target air flow rate obtained at step S1 is greater than zero. When the determination at step S2 is NO, the process moves to step S3. At step S3, the ECU 21 fully opens the bypass valve V2 and fully closes the regulating valve. For example, when the accelerator of the vehicle is rapidly released, the determination at step S2 becomes NO. In such a case, the flow of the oxidant gas, i.e., the flow of air into the fuel cell stack 2 is unnecessary. Thus, the ECU 21 fully opens the bypass valve V2 to allow air to flow into the bypass conduit 8 so that air bypasses the fuel cell stack 2. At this time, when the regulating valve V1 is fully closed, since the pressure in the oxidant gas conduit 3a increases, air is less introduced into the fuel cell stack 2, and the supply of air to the fuel cell stack 2 is reduced. As a result, the drying of the electrolyte membrane due to the flow of excess air into the fuel cell stack 2 is reduced, and the degradation in power generation performance of the fuel cell stack 2 is reduced.

When the process of step S3 is executed, the rotation speed of the compressor K1 is maintained at the rotation speed that has been determined previously. This enables to achieve the required amount of air immediately by only actuating the regulating valve V1 and the bypass valve V2 when the supply of air to the fuel cell stack 2 is required again after this process. That is to say, the temporal delay that occurs till the rotation speed of the compressor K1 recovers can be prevented. The process returns after the process of step S3.

Figure 5:
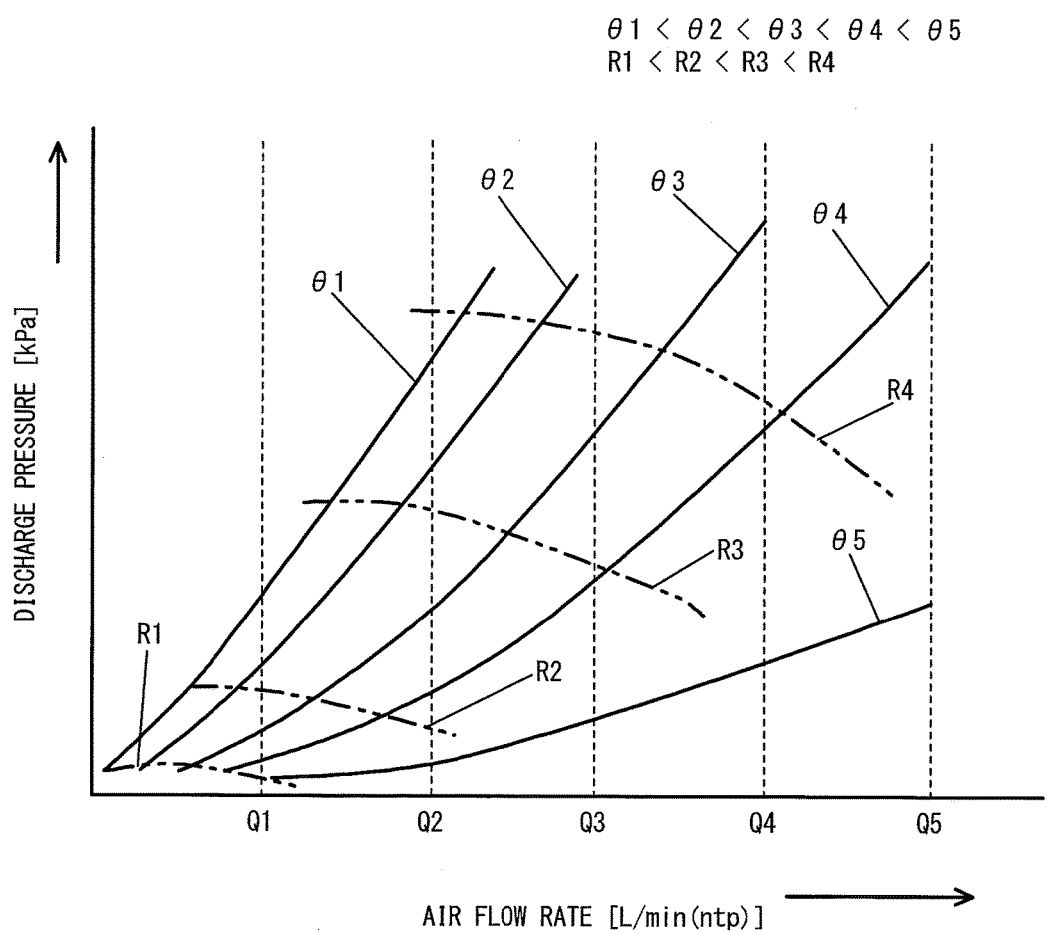
FIG. 5 illustrates a map of the rotation speed of a compressor and the open degree of a regulating valve that control an air flow rate and a discharge pressure.

When the determination at step S2 is YES, the process moves to step S4. At step S4, the compressor rotation speed acquisition unit 21b acquires the commanded rotation speed of the compressor K1, and the regulating valve open degree acquisition unit 21c acquires the commanded open degree of the regulating valve V1. The commanded rotation speed of the compressor K1 and the commanded open degree of the regulating valve V1 are obtained by referring to a map illustrated in FIG. 5 based on the target air flow rate. FIG. 5 illustrates a map of the compressor rotation speed and the regulating valve open degree that control the flow rate of air and the discharge pressure. The flow rate of air supplied to the fuel cell stack 2 is affected by the actual rotation speed of the compressor K1 and the actual discharge pressure of the compressor K1. Here, the compressor K1 is a centrifugal compressor, and the actual discharge pressure of the compressor K1 is affected by the pressure at the outlet K1b of the compressor K1. The pressure at the outlet K1b of the compressor K1 can be adjusted with the open degree of the regulating valve V1. That is to say, the pressure at the outlet K1b of the compressor K1 decreases with increase of the open degree of the regulating valve V1, and increases with decrease of the open degree of the regulating valve V1. As described above, the discharge pressure of the compressor K1 can be controlled by adjusting the open degree of the regulating valve V1. The map referred to at step S4 includes the open degree θn of the regulating valve V1, and θ1 through θ5 are illustrated in the example of the map illustrated in FIG. 5. The relation of θ1<θ2<θ3<θ4<θ5 holds among θ1 through θ5. The map referred to at step S4 includes the rotation speed Rn of the compressor K1, and R1 through R4 are illustrated in the example of the map illustrated in FIG. 5. The relationship of R1<R2<R3<R4 holds among R1 through R4. Here, with reference to the map illustrated in FIG. 5, there are several combinations of the compressor rotation speed and the regulating valve open degree capable of achieving the same air flow rate. For example, the compressor rotation speed capable of achieving the air flow rate Q2 is R2, R3, and R4. As described above, there are several compressor rotation speeds for achieving a certain air flow rate, but the regulating valve open degrees corresponding to the compressor rotation speeds differ from each other. In this case, the compressor rotation speed at which the regulating valve open degree has a larger margin for adjustment is selected as the commanded rotation speed. To achieve the aforementioned air flow rate Q2, R3 is selected as the commanded rotation speed among the compressor rotation speeds R2, R3, and R4. As described above, when R3 at which the regulating valve open degree has a larger margin for adjustment is selected as the commanded rotation speed, the air flow rate is easily adjusted by adjusting the open degree of the regulating valve V1. When the determination at step S2 is YES, the bypass valve V2 is kept fully closed.

At step S5 subsequent to step S4, the command unit 21d commands the compressor K1 to operate at the commanded rotation speed of the compressor K1 obtained at step S4, and commands the regulating valve V1 to operate at the commanded open degree of the regulating valve V1 obtained at step S4. After the command is issued at step S5, the actual air flow rate acquisition unit 21e acquires the actual air flow rate measured by the air flow meter 20 at step S6.

Figure 6:
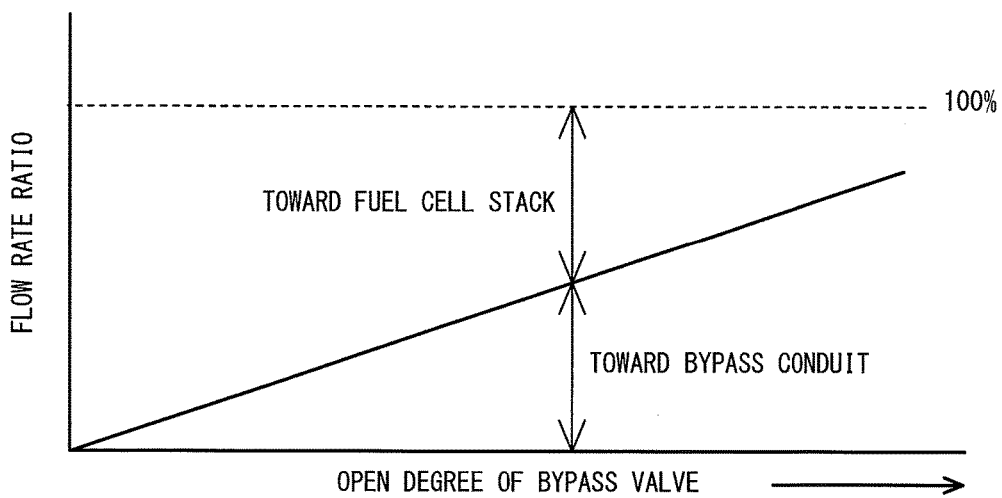
FIG. 6 illustrates a map used to obtain the open degree of a bypass valve to achieve a desired flow rate ratio of a flow rate of air flowing toward the fuel cell stack to a flow rate of air flowing toward a bypass conduit.

At step S7 subsequent to step S6, the air flow rate difference acquisition unit 21f calculates the difference between the actual air flow rate obtained at step S6 and the target air flow rate obtained at step S1. Then, it is determined whether the difference is equal to a predetermined threshold value Qth or less. The threshold value Qth is a predetermined value used to determine whether the actual air flow rate is excessive. When the determination at step S7 is NO, the process moves to step S8. The processes of step S7 and step S8 prevent the electrolyte membrane from drying due to the flow of excess air into the fuel cell stack 2 when the accelerator of the vehicle is rapidly released for example. When the accelerator of the vehicle is rapidly released or the like, the actual flow rate of air discharged from the compressor K1 at that time is greater than the target air flow rate requested after the accelerator is released. Thus, excess air is made to flow toward the bypass conduit 8. More specifically, at step S8, by referring to a map illustrated in FIG. 6, the commanded open degree of the bypass valve V2 is determined to adjust the open degree. Here, FIG. 6 illustrate a map used to obtain the commanded open degree of the bypass valve V2 to achieve a desired flow rate ratio of a flow rate of air flowing toward the fuel cell stack 2 and a flow rate of air flowing toward the bypass conduit 8. This allows the flow rate of air flowing toward the fuel cell stack 2 to come closer to the target air flow rate. In the map illustrated in FIG. 6, only a single line that indicates the distribution between the flow rate of air flowing toward the fuel cell stack 2 and the flow rate of air flowing toward the bypass conduit 8 is illustrated. However, the actual map includes several lines corresponding to the actual air flow rates and the regulating valve open degrees. The reason why the map includes several lines corresponding to the actual air flow rates is to execute the control taking the effect of the pressure drop or the like into account since the effect of the pressure drop and the like differ depending on the actual air flow rate. The process returns to step S6 after step S8.

On the other hand, when the determination at step S7 is YES, the process moves to step S9. At step S9, the air flow rate difference acquisition unit 21f calculates the difference between the value of the target air flow rate obtained at step S1 and the actual air flow rate obtained at step S6 to determine whether the target air flow rate is equal to the actual air flow rate. Here, the complete correspondence between two values is not necessary to determine that the target air flow rate is equal to the actual air flow rate. For example, when the absolute value of the difference between the actual air flow rate and the target air flow rate is less than a predetermined threshold value, the two values may be considered to be equal. As described above, even when the two values differ from each other, when the two values are considered to be the same, the determination at step S9 becomes YES. When the determination at step S9 is YES, the process returns. On the other hand, when the determination at step S9 is NO, the process moves to step S10. At step S10, the ECU 21 changes the regulating valve open degree. That is to say, at step S10, the feedback control unit 21g executes feedback control. More specifically, the ECU 21 executes feedback control to reduce the difference in the air flow rate calculated by the air flow rate difference acquisition unit 21f by changing the commanded open degree of the regulating valve V1 while maintaining the rotation speed of the compressor K1. For example, when R3 is selected as the commanded rotation speed of the compressor K1 at step S4, the ECU 21 changes the commanded open degree of the regulating valve V1 while maintaining the rotation speed R3 of the compressor K1 at step S10. When the comparison between the actual air flow rate and the target air flow rate at step S9 indicates that the actual air flow rate is insufficient, the ECU 21 increases the open degree of the regulating valve V1 to reduce the back pressure. This control increases the flow rate of air sent by the rotation of the compressor K1, thereby increasing the actual flow rate of air supplied to the fuel cell stack 2. On the other hand, when the comparison between the actual air flow rate and the target air flow rate at step S9 indicates that the actual air flow rate is excessive, the ECU 21 decreases the open degree of the regulating valve V1 to increase the back pressure. This control reduces the flow rate of air sent by the rotation of the compressor K1, thereby reducing the actual flow rate of air supplied to the fuel cell stack 2. After the process of step S10 is ended, the processes from step S6 are repeated.

As described above, when the flow rate of air supplied to the fuel cell stack 2 is feedback controlled, high responsiveness of the air flow rate is achieved by adjusting the open degree of the regulating valve V1 while maintaining the rotation speed of the compressor K1. The map illustrating in FIG. 5 reveals that the discharge amount of the compressor K1 can be widely changed by changing the open degree of the regulating valve V1 even when the rotation speed of the compressor K1 is the same. That is to say, the air flow rate can be changed by changing the open degree of the regulating valve V1 while keeping the rotation speed of the compressor K1 the same. The vehicle equipped with the fuel cell system 1 requires a large air flow rate at the time of acceleration. When the air flow rate rapidly changes as described above, the control involving the change of the rotation speed of the compressor K1 is executed. On the other hand, when the air flow rate is controlled at time other than the time of acceleration and time when the required air flow rate is small, it is effective to adjust the open degree of the regulating valve V1 while maintaining the rotation speed of the compressor K1 as the present embodiment does.

Although some embodiments of the present invention have been described in detail, the present invention is not limited to the specific embodiments but may be varied or changed within the scope of the present invention as claimed.

What is claimed is:

1. A fuel cell system comprising:
    a fuel cell stack that is supplied with an oxidant gas and a fuel gas to generate electric power;
    a centrifugal compressor that compresses and supplies the oxidant gas to the fuel cell stack;
    a regulating valve that is arranged in an oxidant gas discharge conduit, the oxidant gas discharge conduit being connected to an outlet of an oxidant gas conduit that is located inside the fuel cell and discharging the oxidant gas from the fuel cell stack, and controls pressure at an outlet of the compressor; and
    a control unit that is programmed to control the compressor and the regulating valve,
    wherein the control unit is programmed to include:
    a command unit that is programmed to determine a rotation speed of the compressor and an open degree of the regulating valve based on a target air flow rate corresponding to a current value instructed to the fuel cell stack, actuates the compressor based on the determined rotation speed, and actuates the regulating valve based on the determined open degree;
    an actual air flow rate acquisition unit that is programmed to acquire a value of an actual flow rate of air supplied to the fuel cell stack while the compressor and the regulating valve operate based on commands from the command unit; and
    an air flow rate difference acquisition unit that is programmed to calculate a difference between the actual flow rate of air and the target air flow rate; and
    a feedback control unit that is programmed to reduce the difference in air flow rate by changing the open degree of the regulating valve while keeping the rotation speed of the compressor constant.

2. The fuel cell system according to claim 1, further comprising:
    a bypass valve that is arranged in a bypass conduit, the bypass conduit connecting an oxidant gas supply conduit that supplies the oxidant gas to the fuel cell stack to an oxidant gas discharge conduit that discharges the oxidant gas from the fuel cell stack, the bypass conduit bypassing the fuel cell stack,
    wherein the control unit is programmed to open the bypass valve while keeping the rotation speed of the compressor constant when the control unit determines that an accelerator is released.

3. The fuel cell system according to claim 1, wherein
    the control unit selects the rotation speed of the compressor at which the regulating valve open degree has a largest margin for adjustment from several combinations of the rotation speed of the compressor and the open degree of the pressure adjustment valve that are capable of achieving the same air flow rate.

* * * * *